United States Patent
Wang et al.

(10) Patent No.: US 9,959,600 B2
(45) Date of Patent: May 1, 2018

(54) MOTION IMAGE COMPENSATION METHOD AND DEVICE, DISPLAY DEVICE

(71) Applicant: BOE Technology Group Co., Ltd., Beijing (CN)

(72) Inventors: Hong Wang, Beijing (CN); Chengqi Zhou, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days. days.

(21) Appl. No.: 15/511,938

(22) PCT Filed: Oct. 9, 2015

(86) PCT No.: PCT/CN2015/091546
§ 371 (c)(1),
(2) Date: Mar. 16, 2017

(87) PCT Pub. No.: WO2016/188010
PCT Pub. Date: Dec. 1, 2016

(65) Prior Publication Data
US 2017/0308998 A1 Oct. 26, 2017

(30) Foreign Application Priority Data
May 28, 2015 (CN) .......................... 2015 1 0284685

(51) Int. Cl.
*G06K 9/00* (2006.01)
*G06T 5/00* (2006.01)
(Continued)

(52) U.S. Cl.
CPC ............ *G06T 5/003* (2013.01); *G06K 9/6202* (2013.01); *G06T 3/0006* (2013.01); *G06T 7/11* (2017.01); *G06T 7/13* (2017.01); *G06T 7/223* (2017.01); *G06T 7/248* (2017.01); *G06T 2207/20021* (2013.01); *G06T 2207/20056* (2013.01); *G06T 2207/20201* (2013.01)

(58) Field of Classification Search
CPC ........... G06T 7/20; G06T 7/223; G06T 7/246; G06T 7/248; G06T 7/262; G06T 7/269;
(Continued)

(56) References Cited

U.S. PATENT DOCUMENTS 7,751,482 B1 * 7/2010 Srinivasan ........... H04N 19/523
375/240.12
8,000,392 B1 * 8/2011 Krupiczka ............. H04N 19/56
375/240.12
(Continued)

FOREIGN PATENT DOCUMENTS

| CN | 102222344 A | 10/2011 |
| CN | 102611824 A | 7/2012 |
| CN | 104917931 A | 9/2015 |

OTHER PUBLICATIONS

Mar. 2, 2016—International Search Report and Written Opinion Appn PCT/CN2015/091546 with Eng Tran.

*Primary Examiner* — Aaron W Carter
(74) *Attorney, Agent, or Firm* — Banner & Witcoff, Ltd.

(57) ABSTRACT

Disclosed are a motion image compensation method and a device, and a display device. The motion image compensation method comprises: acquiring a first image corresponding to a pre-motion picture and a second image corresponding to a post-motion picture; dividing the first image and the second image respectively into several image blocks; performing computations on any pair of mutually corresponding image blocks in the first image and the second image based on a phase correlation method; performing edge detection on the first image and the second image respectively; and according to a preset condition, acquiring, from the at least one displacement vector, a displacement vector matched with a transformation between the edge feature patterns within the pair of mutually corresponding image blocks as a displacement vector corresponding to the pair of image blocks during a motion compensation process.

17 Claims, 5 Drawing Sheets

(51) Int. Cl.
  *G06T 7/246* (2017.01)
  *G06T 7/11* (2017.01)
  *G06T 7/13* (2017.01)
  *G06T 3/00* (2006.01)
  *G06K 9/62* (2006.01)
  *G06T 7/223* (2017.01)

(58) Field of Classification Search
  CPC ........... G06T 7/207; G06T 5/003; G06T 7/13; G06T 7/11; G06T 3/0006; G06T 2207/20056; G06T 2207/20021; G06F 17/30811; H04N 5/144; H04N 19/51; H04N 19/503; H04N 5/145; G06K 9/6203; G06K 2009/4666; G06K 9/6202; G09G 2320/106
  USPC ....... 382/107, 190, 191, 192, 195, 199, 205, 382/278, 279, 280, 282, 288, 289, 298, 382/299, 300; 348/154, 155, 169, 208.13, 348/208.14, 352, 402.1, 407.1, 413.1, 348/416.1, 699
  See application file for complete search history.

(56) References Cited

U.S. PATENT DOCUMENTS

| | | | | |
|---|---|---|---|---|
| 8,184,200 B1 * | 5/2012 | Biswas | ................. | H04N 7/014 348/443 |
| 8,233,730 B1 * | 7/2012 | Namboodiri | ........... | H04N 7/014 382/232 |
| 8,295,607 B1 * | 10/2012 | Biswas | ..................... | G06T 7/13 382/192 |
| 8,340,189 B1 * | 12/2012 | Krupiczka | ............. | H04N 19/56 375/240.12 |
| 8,477,848 B1 * | 7/2013 | Patankar | ................. | H04N 7/014 375/240.16 |
| 8,942,503 B1 * | 1/2015 | Woodall | ............... | H04N 19/527 382/236 |
| 9,031,131 B1 * | 5/2015 | Patankar | ............... | H04N 7/014 375/240.16 |
| 9,197,891 B1 * | 11/2015 | Namboodiri | ..... | H04N 19/00684 |
| 2005/0053291 A1 * | 3/2005 | Mishima | ................ | H04N 5/145 382/236 |
| 2007/0165957 A1 * | 7/2007 | De Haan | ................ | H04N 19/51 382/236 |
| 2010/0020244 A1 * | 1/2010 | Mitsuya | ........... | H04N 5/23248 348/699 |
| 2010/0150225 A1 * | 6/2010 | Wredenhagen | ...... | H04N 19/176 375/240.02 |
| 2010/0309980 A1 | 12/2010 | Suzuki et al. | | |
| 2011/0255599 A1 * | 10/2011 | Sartor | ..................... | G06T 7/223 375/240.16 |
| 2012/0155727 A1 * | 6/2012 | Orderud | ................. | G06T 7/262 382/131 |
| 2012/0294492 A1 * | 11/2012 | Kamei | ................ | G06K 9/6203 382/107 |

* cited by examiner

MOTION IMAGE COMPENSATION METHOD AND DEVICE, DISPLAY DEVICE

CROSS REFERENCE TO RELATED APPLICATIONS

The application is a U.S. National Phase Entry of International Application No. PCT/CN2015/091546 filed on Oct. 9, 2015, designating the United States of America and claiming priority to Chinese Patent Application No. 201510284685.1 filed in China on May 28, 2015. The present application claims priority to and the benefit of the above-identified applications and the above-identified applications are incorporated by reference herein in their entirety.

TECHNICAL FIELD

The present disclosure relates to the field of display technology, and particularly to a moving image compensation method and device, and a display device.

BACKGROUND

Motion estimate and motion compensation (MEMC) algorithm is a moving image compensation technology commonly used in prior liquid crystal TVs. Its principle is to insert a motion compensation frame between two traditional frames of images using a dynamic image system to increase the 50/60 Hz refresh rate of a common flat television to 100/120 Hz. In this way, the motion pictures are more clear and fluent and better than the normal response effect. The introduction of motion compensation frame may clear the ghost of the last frame of image, improve the dynamic definition, and further reduce the image trailing to the extent that is difficult to be perceived by human eyes. In a class of MEMC algorithms based on block features, the key for a good compensation is to determine the displacement vector of each image block in images accurately.

In this regard, the phase plane correlation (PPC) method may utilize the phase correlation degree in frequency domain of previous and next images to determine the displacement vector of each image block, with advantages of good accuracy and high flexibility. However, the displacement vector with the highest phase correlation degree does not necessarily reflect the actual motion of the image block, would therefore cause partial determined displacement vector experience large deviation of actual motion for the next image with respect to the previous image, thereby influencing the final moving image compensation effect.

SUMMARY

In view of the defects in prior art, the present disclosure provides a moving image compensation method and device, a display device that can address the problem that the displacement vector with the highest phase correlation degree does not necessarily reflect actual motion of image blocks, which causes a large deviation between the partial displacement vector determined in the MEMC algorithm and the actual motion of corresponding image blocks.

In the first aspect, a moving image compensation method is provided, comprising: acquiring a first image corresponding to a pre-motion picture and a second image corresponding to a post-motion picture; dividing the first image and the second image into a number of image blocks respectively, the image blocks in the first image and the image blocks in the second image being in one-to-one correspondence; performing calculation on any pair of image blocks corresponding to each other in the first image and the second image based on a phase plane correlation method to obtain at least one displacement vector with a phase correlation degree greater than a preset threshold; subjecting the first image and the second image to edge detection respectively to obtain edge feature patterns in the pair of image blocks corresponding to each other; and acquiring a displacement vector that matches a transformation between edge feature patterns in the pair of image blocks corresponding to each other from the at least one displacement vector according to a predetermined condition as a displacement vector corresponding to the pair of image blocks in a motion compensation process.

Electively, further comprising: acquiring a center of gravity of the edge feature pattern in each image block in the first image or the second image; connecting the centers of gravity corresponding to any three image blocks in the first image or the second image into a triangle; calculating affine transformation matrices before and after three vertices of the triangle move along displacement vectors corresponding to image blocks in which they are located based on the displacement vector corresponding to each image block in the three image blocks; and subjecting images in the triangle to affine transformation using the affine transformation matrices to obtain partial compensation images corresponding to pictures in motion.

Electively, the centers of gravity of edge feature patterns in all of the image blocks in the first image or the second image are connected into a triangular mesh.

Electively, the performing calculation on any pair of image blocks corresponding to each other in the first image and the second image based on a phase plane correlation method to obtain at least one displacement vector with a phase correlation degree greater than a preset threshold comprises: subjecting any pair of image blocks corresponding to each other in the first image and the second image to Fourier transformation; subjecting the image block after Fourier transformation to plural division operation and subjecting the operation result to inverse Fourier transformation to obtain a impulse function; seeking peaks in the impulse function according to preset rules to obtain at least one displacement vector with a phase correlation degree greater than the preset threshold, in which coordinates of any peak in the impulse function represent one displacement vector and a height of the peak represents the phase correlation degree of the displacement vector.

Electively, before the performing calculation on any pair of image blocks corresponding to each other in the first image and the second image based on a phase plane correlation method to obtain at least one displacement vector with a phase correlation degree greater than a preset threshold, the method further comprises: enlarging a range of the pair of image blocks in the first image and the second image towards all around to a preset size; after the performing calculation on any pair of image blocks corresponding to each other in the first image and the second image based on a phase plane correlation method to obtain at least one displacement vector with a phase correlation degree greater than a preset threshold, the method further comprises: restoring the range of the pair of image blocks in the first image and the second image from the preset size to an original size.

Electively, the step of subjecting the first image and the second image to edge detection respectively to obtain edge feature patterns in the pair of image blocks corresponding to each other comprises: obtaining edge lines in the first image and the second image using an edge detection algorithm; for an entirely closed edge line, a pattern including a part of a region enclosed by the entirely closed edge line that is in an image block and a boundary of the image block is used as the edge feature pattern in the image block; and for a non-entirely closed edge line, a part of said non-entirely closed edge line that is in an image block is used as the edge feature pattern in the image block.

Electively, the step of acquiring a displacement vector that matches a transformation between edge feature patterns in the pair of image blocks corresponding to each other from the at least one displacement vector according to a predetermined condition comprises: moving edge feature patterns in image blocks in the first image along the above-mentioned at least one displacement vectors respectively; comparing the moved edge feature patterns and edge feature patterns in corresponding image blocks in the second image to determine an overlapping degree between the moved edge feature patterns and edge feature patterns in corresponding image blocks in the second image; and determining a displacement vector corresponding to a moved edge feature pattern having a highest overlapping degree with the edge feature pattern in the corresponding image block in the second image as the displacement vector that matches the transformation between edge feature patterns in the image blocks corresponding to each other in the first image and the second image.

Electively, the number of image blocks have an equal area and a same shape.

In the second aspect, a moving image compensation device is provided, comprising: a first acquisition module for acquiring a first image corresponding to pre-motion picture and a second image corresponding to post-motion picture; a division module for dividing the first image and second image obtained by the first acquisition module into a number of image blocks respectively, in which image blocks in the first image and image blocks in the second image are in one-to-one correspondence; a first calculation module for performing calculating any pair of image blocks corresponding to each other in the first image and the second image by the division module based on phase plane correlation method and obtaining at least one displacement vectors with a phase correlation degree greater than a preset threshold; an edge detection module for subjecting the first image and the second image obtained by the first acquisition module to edge detection respectively to obtain edge feature patterns in the pair of image blocks corresponding to each other; and a second acquisition module for acquiring a displacement vector that matches a transformation between edge feature patterns in the pair of image blocks corresponding to each other from the at least one displacement vector obtained by the first calculation module according to predetermined conditions as a displacement vector corresponding to the pair of image blocks in a motion compensation process.

Electively, further comprising: a third acquisition module for acquiring centers of gravity of edge feature patterns in each image block obtained by the edge detection module in the first image or the second image; a patterning module for connecting centers of gravity corresponding to any three image blocks in the first image or the second image obtained by the third acquisition module into a triangle; a second calculating module for calculating affine transformation matrices before and after moving three vertices of the triangle obtained by the patterning module along displacement vectors corresponding to image blocks in which they are located in respectively based on the displacement vector corresponding to every image block in the three image blocks obtained by the second acquisition module; and a third calculating module for subjecting images in the triangle to affine transformation using the affine transformation matrices obtained by the second calculating module to obtain partial compensation image corresponding to the picture in motion.

Electively, the centers of gravity of edge feature patterns in all of the image blocks in the first image or the second image are connected into a triangular mesh.

Electively, the first calculating module comprises: a transformation unit for subjecting any pair of image blocks corresponding to each other obtained by the division module in the first image and the second image to Fourier transformation; a reverse transformation unit for subjecting the pair of image blocks after Fourier transformation by the transformation unit to plural division operation and subjecting the operation result to inverse Fourier transformation to obtain a impulse function; a peak-seeking unit for seeking peaks in the impulse function obtained by the reverse transformation unit according to preset rules to obtain at least one displacement vector with a phase correlation degree greater than the preset threshold, in which coordinates of any peak in the impulse function represent one displacement vector and a height of the peak represents the phase correlation degree of the displacement vector.

Electively, further comprising: an enlarging module for enlarging the range of the pair of image blocks in the first image and the second image towards all around to a preset size before the first calculating module calculates any pair of image blocks corresponding to each other in the first image and the second image by the division module based on the phase plane correlation method and obtains at least one displacement vectors with a phase correlation degree greater than a preset threshold; an restoring module for restoring the range of the pair of image blocks in the first image and the second image from the preset size to an original size after the first calculating module calculates any pair of image blocks corresponding to each other in the first image and the second image by the division module based on the phase correlation method and obtains at least one displacement vectors with a phase correlation degree greater than a preset threshold.

Electively, the edge detection module is configured for: obtaining edge lines in the first image and the second image using an edge detection algorithm; for an entirely closed edge line, a pattern including a part of a region enclosed by the entirely closed edge line that is in an image block and a boundary of the image block is used as the edge feature pattern in the image block; and for a non-entirely closed edge line, a part of the non-entirely closed edge line that is in an image block is used as the edge feature pattern in the image block.

Electively, the second acquisition module is configured for: moving edge feature patterns in image blocks in the first image along the above-mentioned at least one displacement vectors respectively; comparing the moved edge feature patterns and edge feature patterns in corresponding image blocks in the second image to determine an overlapping degree between the moved edge feature patterns and edge feature patterns in corresponding image blocks in the second image; and determining a displacement vector corresponding to a moved edge feature pattern having a highest overlapping degree with the edge feature pattern in the corresponding image block in the second image as the displacement vector that matches the transformation between edge feature patterns in the image blocks corresponding to each other in the first image and the second image.

Electively, the number of image blocks have an equal area and a same shape.

In the third aspect, a moving image compensation device is provided, comprising one or more processors and a storage medium storing computer readable operation instructions that, while being executed, cause the processor to carry out steps of: acquiring a first image corresponding to a pre-motion picture and a second image corresponding to a post-motion picture; dividing the first image and the second image into a number of image blocks respectively, the image blocks in the first image and the image blocks in the second image being in one-to-one correspondence; performing calculation on any pair of image blocks corresponding to each other in the first image and the second image based on a phase plane correlation method to obtain at least one displacement vector with a phase correlation degree greater than a preset threshold; subjecting the first image and the second image to edge detection respectively to obtain edge feature patterns of the pair of image blocks corresponding to each other; and acquiring a displacement vector that matches a transformation between edge feature patterns in the pair of image blocks corresponding to each other from the at least one displacement vector according to predetermined conditions as a displacement vector corresponding to the pair of image blocks in a motion compensation process.

In the fourth aspect, a display device is provided, comprising the moving image compensation device.

As can be known from the above-mentioned technical proposal, embodiments of the present disclosure may obtain the best matched displacement vector from the displacement vector sequence obtained based on phase correlation method using the transformation situation between edge feature patterns in pre- and post-pictures obtained by edge detection, and can therefore improve representativeness of the displacement vector for actual movement of corresponding image block, and can address the problem that the partial displacement vector determined in MEMC algorithm has a large deviation since the displacement vector with the highest phase correlation degree does not necessarily reflect the actual movement of the image block.

Furthermore, the present disclosure may allow the motion compensated images obtained by MEMC algorithm approach consistent with the transformation of edge feature patterns in pre- and post-images, which is in favor of achieving a better moving image compensation effect.

BRIEF DESCRIPTION OF DRAWINGS

In order to make the embodiments of the disclosure apparent, the drawings related to the embodiments of the disclosure will be described briefly. Apparently, the described embodiments are just a part of the embodiments of the disclosure. For those skilled in the art, he or she can obtain other figure(s) according to these figures, without any inventive work.

DETAILED DESCRIPTION

In order to make the technical solution of the embodiments of the disclosure more clear, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Figure 1:
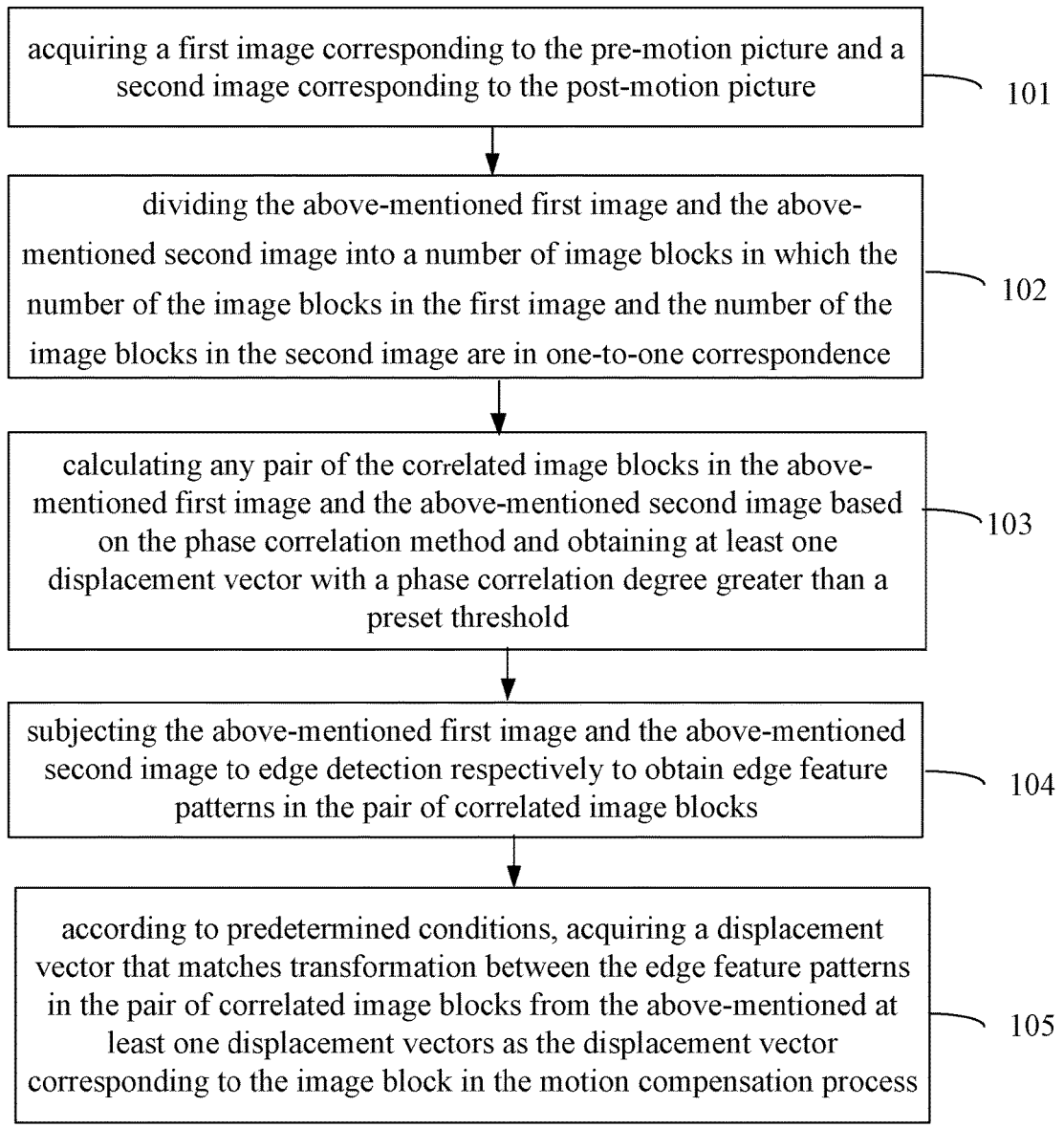
FIG. 1 is a flowchart of steps of a moving image compensation method according to one embodiment of the present disclosure.

FIG. 1 is a flowchart of steps of a moving image compensation method according to one embodiment of the present disclosure. Referring to FIG. 1, the method includes:

step 101: acquiring a first image corresponding to the pre-motion picture and a second image corresponding to the post-motion picture;

step 102: dividing the above-mentioned first image and the above-mentioned second image into a number of image blocks in which the number of the image blocks in the first image and the number of the image blocks in the second image are in one-to-one correspondence;

step 103: calculating any pair of the correlated image blocks in the above-mentioned first image and the above-mentioned second image based on the phase correlation method and obtaining at least one displacement vector with a phase correlation degree greater than a preset threshold;

step 104: subjecting the above-mentioned first image and the above-mentioned second image to edge detection respectively to obtain edge feature patterns in the pair of correlated image blocks; and step 105: according to predetermined conditions, acquiring a displacement vector that matches transformation between the edge feature patterns in the pair of correlated image blocks from the above-mentioned at least one displacement vectors as the displacement vector corresponding to the image block in the motion compensation process.

In the above-mentioned step 101, the pre-motion picture and the post-motion picture may be from for example two adjacent frames of a video file in the computer equipment, or the two images captured in sequence by a capturing device, or pictures of adjacent two frames to be displayed by a display device, which is not limited by the present disclosure. The pre-motion picture and post-motion picture are relative concepts so long as feature patterns in the post-motion picture experiences variation, namely displacement relative to the pre-motion picture. It is to be understood that in different application scenarios, the first image and the second image may be acquired by for example image sampling, which will not be described any more herein.

In the above-mentioned step 102, the image blocks resulting from division are generally of the same size, or alternatively of different sizes. Various image blocks in the first image and various image blocks in the second image are in one-to-one correspondence, and two image blocks corresponding to each other in the first image and the second image are referred to as a pair of image blocks herein. In one embodiments of the present disclosure, transformation of each part between the first image and the second image is sampled with a pair of image blocks as a minimum unit.

In the above-mentioned step 103, the phase correlation method is a method for calculating displacement vectors in moving images in prior art and may include frequency domain transformation and reverse transformation of images, and operations in frequency domain of images, which mainly utilizes movements (displacement vector) of frequency features of the same class in two images to represent movement of one image region and guarantees the accuracy of the resultant displacement vectors by reflecting phase correlation of frequency features between the two images. Generally, for any pair of image blocks corresponding to each other in two images, a plurality of displacement vectors may be obtained by the phase correlation method and the phase correlation degree of each displacement vector may be obtained at the same time. Therefore, in the above-mentioned step 103, it is possible to select at least one displacement vector with the phase correlation degree greater than the preset threshold and exclude displacement vectors with too small phase correlation degree to reduce operation efforts.

In the above-mentioned step 104, there are many methods for detecting image edges, for example, edge detection algorithm based on various differential operators (Sobel, Robert, Prewitt, Laplacian, Canny etc.) etc. Detected edge lines are contour lines of various patterns in images, for example, may be closed curved lines, non-closed straight lines or mesh lines etc. In each image block, for an entirely closed edge line, a pattern including the part located in the image block and the image block boundary is the edge feature pattern in the image block. For a non-entirely-closed edge line, the part in the image block is the edge feature pattern in the image block. Of course, the process involved in step 104 is different for different edge detection method and may include but not limited to procedures such as gray scaling, binary imaging and de-noising.

In the above-mentioned step 105, a displacement vector truly reflecting movement of an image block should generally truly reflect movement of edge image feature in image blocks, and therefore may screen displacement vectors using edge image features to obtain displacement vectors that can reflect movement of image blocks best. For instance, the above-mentioned preset conditions may include: moving the edge feature patterns in an image block in the first image along the above-mentioned at least one displacement vectors respectively, and comparing the moved edge feature patterns to the edge feature patterns in corresponding image blocks in the second image, determining the displacement vectors corresponding to the moved edge feature pattern that has the highest overlapping degree with the edge feature patterns in the corresponding image block in the second image as the displacement vector that matches the transformation between edge feature patterns in corresponding image blocks in the first image and the second image. It is understood that the displacement vector obtained in the above-mentioned way can represent the movement of edge feature patterns best, and therefore the displacement vector may function as the displacement vector that corresponds to the pair of image blocks in the motion compensation process to compensate the first image or the second image for motions in the moving image compensation procedure.

It is to be noted that the above-mentioned steps 103 and 104 may be carried out in any order, which is not limited by embodiments of the present disclosure. At the same time, it is to be understood that the above-mentioned steps 103 to 105 are a flow for processing any pair of image blocks, while other pairs of image blocks may be processed in similar way, in batch or one by one, which is not limited by embodiments of the present disclosure.

As can be known from the above-mentioned technical proposal, embodiments of the present disclosure may obtain the displacement vector that matches the transformation between the above-mentioned edge feature patterns best from the displacement vector sequence obtained based on phase correlation method based on the transformation between edge feature patterns in pre- and post-pictures obtained by edge detection, and can therefore improve representativeness of the displacement vector for actual movement of corresponding image block, and can address the problem that the partial displacement vector determined in MEMC algorithm has a large deviation with the actual movement of corresponding image block since the displacement vector with the highest phase correlation degree does not necessarily reflect the actual movement of the image block.

Furthermore, embodiments of the present disclosure may allow the motion compensated images obtained by MEMC algorithm approach consistent with the transformation of edge feature patterns in pre- and post-images, which is in favor of achieving a better moving image compensation effect.

What is different from embodiments of the present disclosure is that, in prior MEMC algorithm, in view that the phase correlation degree may guarantee reliability of displacement vectors and the displacement vector with the maximum phase correlation degree is often used as the displacement vector corresponding to each image block directly, this actually neglects the deviation generated due to the fact that spectrum analysis is only conducted in the small range of the image block, and the obtained displacement vector does not always reflect the actual movement of the image block.

In another aspect, on the basis of already obtaining displacement vector of each image block, in the motion compensation process of prior art MEMC algorithm, a common motion compensation mode is to move each image block in the image directly according to the predicted displacement vector to form a motion compensation frame between two frames of images. The above-mentioned processing mode would result in image loss in partial regions after moving image blocks, and further would result in sudden change at edges of image blocks after movement, thereby influencing display uniformity of the entire picture.

Figure 2:
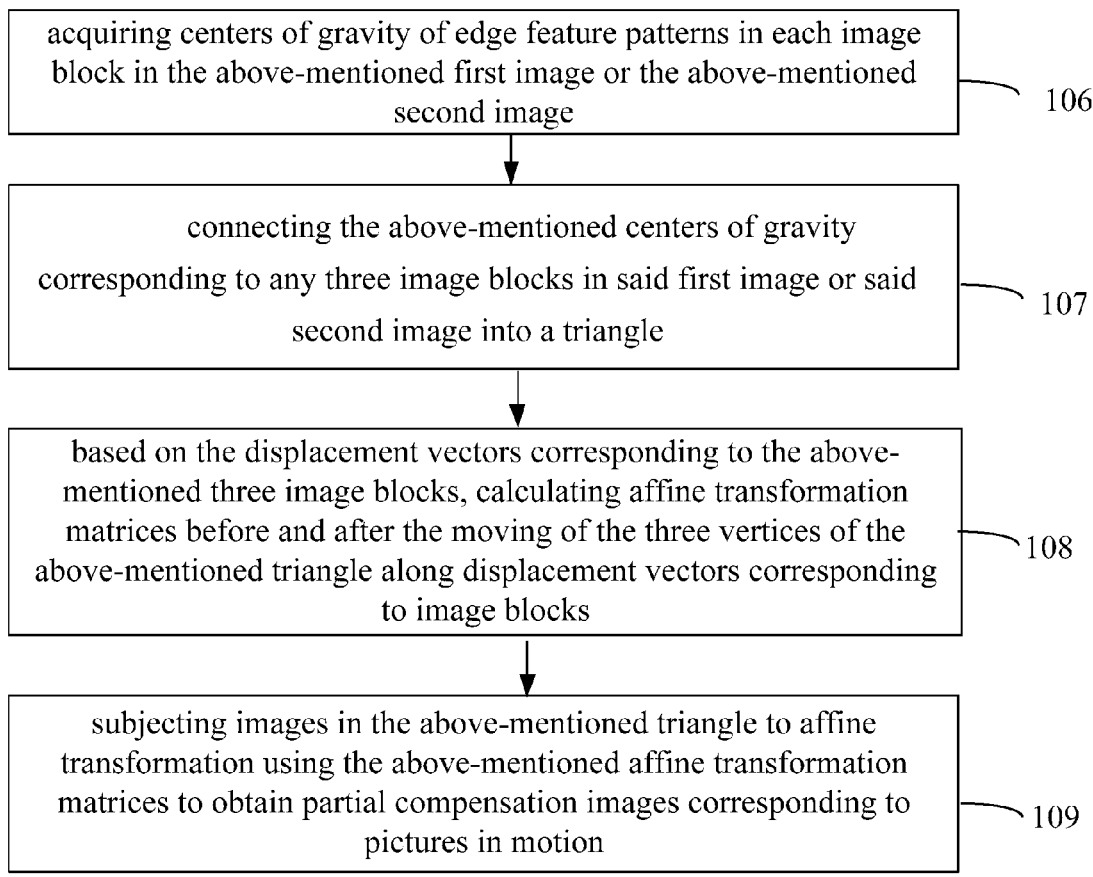
FIG. 2 is a flowchart of steps of a moving image compensation method according to another embodiment of the present disclosure.

In view of this, the embodiment of the present disclosure may further include the following steps shown in FIG. 2 after the above-mentioned step 105:

step 106: acquiring centers of gravity of edge feature patterns in each image block in the above-mentioned first image or the above-mentioned second image;

step 107: connecting the above-mentioned centers of gravity corresponding to any three image blocks in said first image or said second image into a triangle;

step 108: based on the displacement vectors corresponding to the above-mentioned three image blocks, calculating affine transformation matrices before and after the moving of the three vertices of the above-mentioned triangle along displacement vectors corresponding to image blocks;

step 109: subjecting images in the above-mentioned triangle to affine transformation using the above-mentioned affine transformation matrices to obtain partial compensation images corresponding to pictures in motion.

It is understandable in the above-mentioned step 106 that, the motion compensation process in the MEMC algorithm may be carried out by moving the image blocks of the first image in the directions of corresponding displacement vectors based on the first image and the displacement vectors, and may also be carried out by moving the image blocks of the second image in the reverse directions of corresponding displacement vectors based on the second image and the displacement vectors, which is not limited by embodiments of the present disclosure. To facilitate description, the mode in which motion compensation is carried out by moving image blocks of the first image in directions of corresponding displacement vectors based on the first image and the displacement vectors will be described below as an example. For closed edge feature patterns such as trapezoid and ellipse and non-closed edge feature patterns such as straight line, broken line and curved line, their centers of gravity are all their geometrical centers.

In the above-mentioned steps 107 to 109, it is understandable that in embodiments of the present disclosure, centers of gravity of edge feature patterns in any three image blocks are considered as three points on surfaces of the same rigid body, and transformation before and after moving a part of the first image that are located in the triangle along displacement vectors corresponding to three vertices of the triangle respectively is considered as a affine transformation including translation and rotation. Thereby, after triangles are defined by centers of gravity in step 107 in the embodiment of the present disclosure, it is possible to obtain respective affine transformation matrices by displacement vectors corresponding to the image blocks in which the three vertices of the triangle are located in step 108, and subject the part of the first image that is in the triangle to affine transformation with the obtained affine transformation matrices in step 109 to obtain partial compensation image corresponding to the picture in motion (namely the image in the range of triangle after affine transformation).

It is understandable that related procedure of affine transformation is known by those skilled in the art and will not be described any more herein. Furthermore, with reference to the above-mentioned process, in embodiments of the present disclosure, it is possible to cover most pixels in the first image with a plurality of triangles with vertices all being centers of gravity of edge feature patterns in image blocks, thereby obtaining the main body part of the above-mentioned compensation image; while for the small part of region that cannot be covered by triangles, it is possible to process them by affine transformation with affine transformation matrices corresponding to neighboring triangles. In a preferred embodiment of the present disclosure, centers of gravity of edge feature patterns in all image blocks in the above-mentioned first image or said second image are connected into a triangle mesh. The triangular mesh may cover vast majority of picture of said first image or second image, therefore accurate moving image compensation may be implemented for most pixel points.

It is observed that in embodiments of the present disclosure, with the motion compensation flow based on affine transformation, said triangular mesh can cover vast majority of region in the image, thereby avoiding image loss caused by moving image blocks, and may allow image transformation in each triangle to be smooth and free of sudden change. Embodiments of the present disclosure can address the problem with prior art MEMC algorithm that the picture display uniformity is poor due to moving image blocks, are advantageous for taking full advantage of the obtained edge feature patterns to improve algorithm efficiency and may further improve moving image compensation effect.

Figure 3:
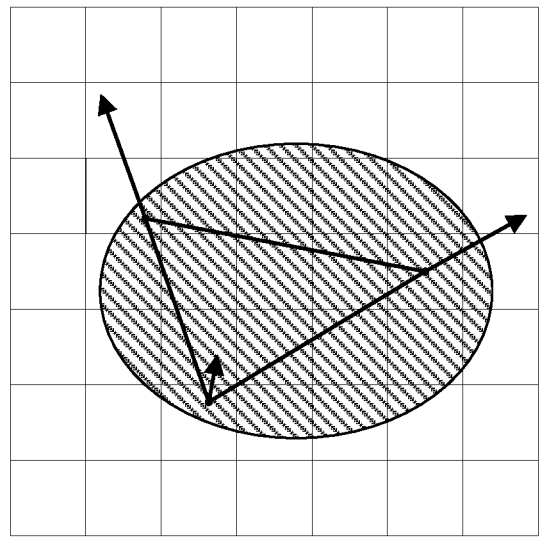
FIG. 3 is a part of a first image before motion compensation in one embodiment of the present disclosure.

As a more specific example, FIG. 3 is partial first image before motion compensation according to one embodiment of the present disclosure. Referring to FIG. 3, the image block division in the partial first image is shown in a 7×7 pane, and the edge detection result in the partial first image is shown as an ellipse, in which the three vertices of a triangle show centers of gravity of edge feature patterns in three image blocks respectively and three arrows show displacement vectors corresponding to these three image blocks respectively. It can be seen that in the image block in which the upper left vertex of the triangle is located and the image block in which the lower left vertex is located, the edge feature patterns are a pattern similar to a right triangle with a bevel edge as arc and a pattern similar to a right angle trapezoid with a bevel edge as arc, and therefore centers of gravity of the two edge feature patterns are both located at their geometrical centers; while in the image block in which the upper right vertex of the triangle is located, the edge feature pattern is an entire square, and therefore its center of gravity coincides with the center of the image block.

According to the triangle shown in FIG. 3, in combination with the three displacement vectors shown in FIG. 3, it is possible to obtain the affine transformation matrix corresponding to the triangle. Therefore, the part of the first image that is located in the triangle may be subject to image transformation according to the affine transformation matrix to obtain partial compensation image corresponding to the picture in motion, namely the image in the range of the triangle after affine transformation.

Figure 4:
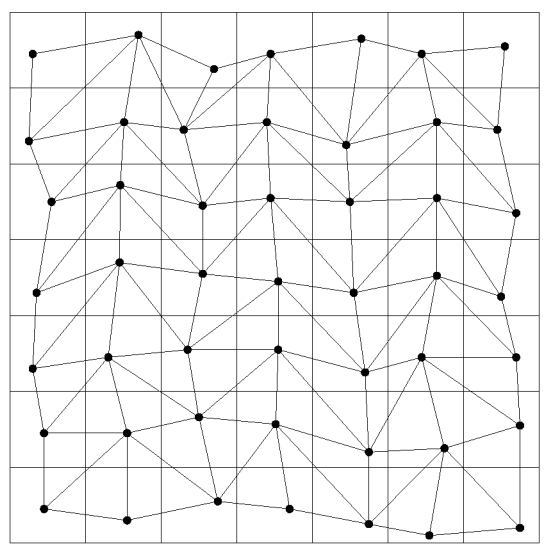
FIG. 4 is a schematic diagram of centers of gravity of edge feature patterns in all image blocks in the first image and the triangular mesh formed by connecting them in one embodiment of the present disclosure.

As an example, FIG. 4 is a schematic diagram of centers of gravity of edge feature patterns in all image blocks in the first image and the triangular mesh formed by connecting them in an embodiment of the present disclosure. As can be seen, centers of gravity of edge feature patterns in all image blocks in FIG. 4 are connected into a triangular mesh covering vast majority of the first image in which any one pixel point may be subject to image transformation according to the affine transformation matrix obtained based on the displacement vector corresponding to the three vertices of the triangle according to the triangle in which the pixel point is located. It is understandable that in the finally obtained compensation image, each of the above-mentioned centers of gravity has been moved in its respective displacement vector but can still constitute a triangular mesh of another shape. Under the suitable setting, it is possible to guarantee that the triangular mesh in the compensation image can still cover vast majority of the range in the compensation image. As can be seen, the triangular mesh can cover vast majority of the picture, and it is therefore possible to implement accurate moving image compensation for most pixel points.

Figure 5:
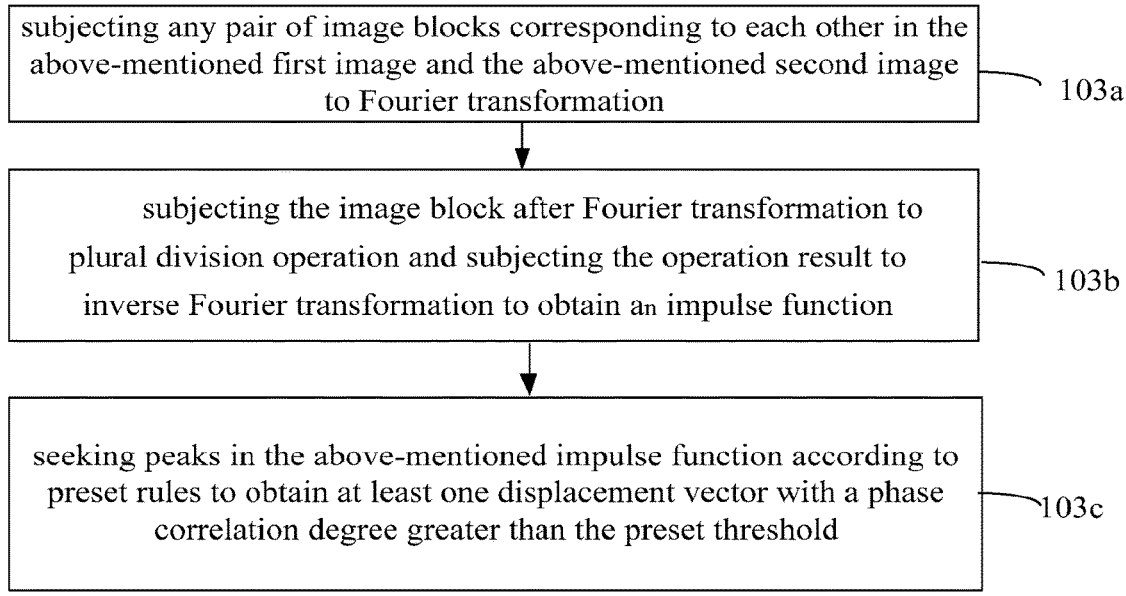
FIG. 5 is a flowchart of steps for calculating displacement vectors based on phase correlation method in one embodiment of the present disclosure.

As a specific example of the phase correlation method, the above-mentioned step 103 in the embodiment of the present disclosure: the step of calculating any pair of correlated corresponding image blocks in the above-mentioned first image and the above-mentioned second image based on the phase correlation method and obtaining at least one displacement vector with a phase correlation degree greater than a preset threshold specifically includes the following steps as shown in FIG. 5:

step 103a: subjecting any pair of image blocks corresponding to each other in the above-mentioned first image and the above-mentioned second image to Fourier transformation;

step 103b: subjecting the image block after Fourier transformation to plural division operation and subjecting the operation result to inverse Fourier transformation to obtain an impulse function; and step 103c: seeking peaks in the above-mentioned impulse function according to preset rules to obtain at least one displacement vector with a phase correlation degree greater than the preset threshold, in which coordinates of any peak in the above-mentioned impulse function represent one displacement vector and the height of the peak represents the phase correlation degree of the displacement vector.

For instance, the algorithm adopted in the above-mentioned step 103a may be fast Fourier transformation (FFT) that can obtain a spectrogram for the pair of image blocks. Specifically, assuming the image block in the first image as B1(x, y) and the image block in the second image as B2(x, y), the results of the fast Fourier transformation F1(u, v) and F2(u, v) may be expressed as:

$$F1(u,v) = \iint B1(x,y) e^{-12\pi(ux+vy)} dxdy$$

$$F2(u,v) = \iint B2(x,y) e^{-12\pi(ux+vy)} dxdy$$

On this basis, the plural division operation in the above-mentioned step 103b may be expressed as:

$$M(u, v) = \frac{F2(u, v)}{F1(u, v)} = e^{i2\pi(uk+vs)}$$

Thereby, an impulse function is obtained by inverse Fourier transformation in the above-mentioned step 103b:

$$m(k,s) = \iint M(u,v) e^{i2\pi(uk+vs)} dudv$$

Therefore, in the above-mentioned step 103c, it is possible to obtain the above-mentioned at least one displacement vector by peak-seeking the impulse function in (k, s). Coordinates of any peak in the above-mentioned impulse function m(k, s) represent one displacement vector, and the height of the peak represents the phase correlation degree of the displacement vector. It is to be noted that the above-mentioned fast Fourier transformations are all obtained by universe integration, and it may be known from the property of the Fourier transformation that the impulse function m(k, s) has a domain of definition with the same size as B1(x, y) or B2(x, y).

Based on this, the phase plane correlation (PPC) may utilize phase correlation degree of pre- and post-images in frequency domain to determine the displacement vector of every image block, which has advantages such as good accuracy and high flexibility. In combination of the method, embodiments of the present disclosure may utilize sorting of phase correlation degrees in combination of transformation of edge feature patterns to implement moving image compensation.

On the basis of any of the above-mentioned moving image compensation method, the following steps may be further included prior to step 103: calculating any pair of correlated corresponding image blocks in the above-mentioned first image and the above-mentioned second image based on the phase correlation method to obtain at least one displacement vector with a phase correlation degree greater than a preset threshold:

step 103x: enlarging the pair of image blocks towards all around to a preset size in terms of the range in the above-mentioned first image and the above-mentioned second image.

At the same time, after the above-mentioned step 103: calculating any pair of correlated corresponding image blocks in the above-mentioned first image and the above-mentioned second image based on the phase correlation method to obtain at least one displacement vector with a phase correlation degree greater than a preset threshold, the above-mentioned method may further include the following steps:

step 103y: restoring the pair of image blocks from the above-mentioned preset size to its original size in terms of the range in the above-mentioned first image and the above-mentioned second image.

It is understandable that based on the flow of the above-mentioned step 103x and the above-mentioned step 103y, for every image block, the phase plane correlation may calculate more displacement vectors in a larger image range. Therefore, embodiments of the present disclosure may well address the problem that the obtained displacement vector does not have representativeness due to the too small range of image blocks or edge lines in image blocks are intermittent and the spectrogram has large deviation. For example, for an image block of 10×10 pixels, it is possible to carry out the above-mentioned flow of steps 103a to 103c for an image in a range of 30×30 pixels with the image block as the center while calculating the displacement vector to obtain a more accurate and more representative displacement vector.

Figure 6:
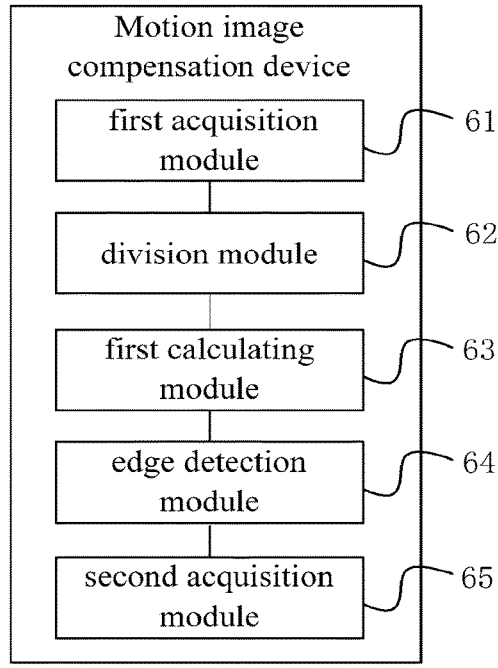
FIG. 6 is a structure block diagram of a moving image compensation device according to one embodiment of the present disclosure.
Figure 7:
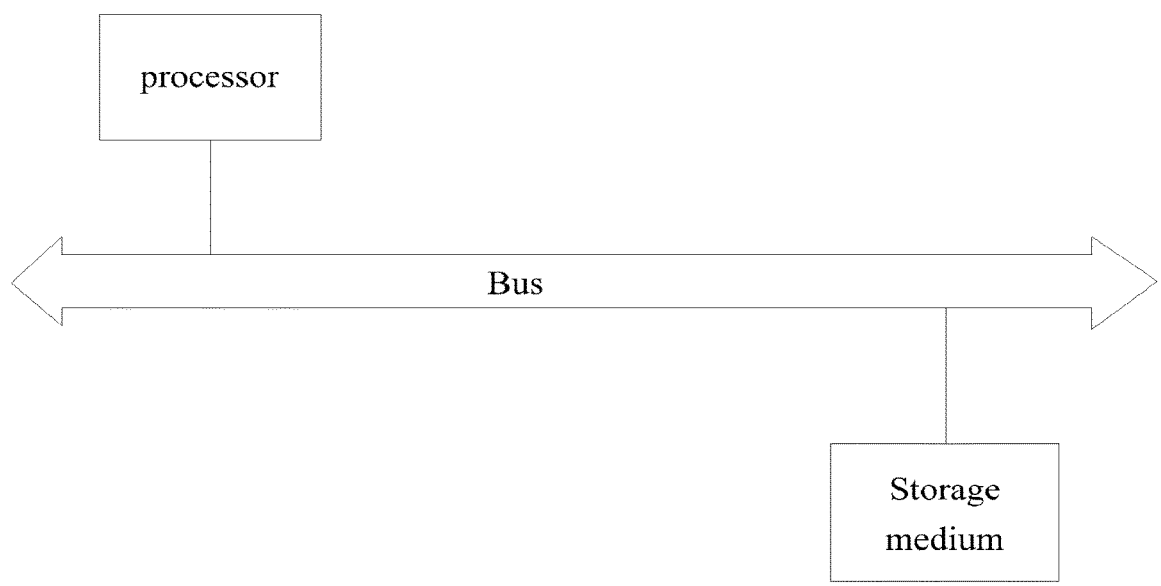
FIG. 7 is a structure diagram of a moving image compensation device according to one embodiment of the present disclosure.

Based on the disclosed same concept, an embodiment of the present disclosure provides a moving image compensation system. FIG. 6 is a structure block diagram of a moving image compensation system according to one embodiment of the present disclosure. Referring to FIG. 6, the device includes:

a first acquisition module 61 for acquiring a first image corresponding to pre-motion picture and a second image corresponding to post-motion picture;

a division module 62 for dividing the first image and second image obtained by the above-mentioned first acquisition module 61 into a number of image blocks respectively, in which image blocks in the above-mentioned first image and image blocks in the above-mentioned second image are in one-to-one correspondence;

a first calculation module 63 for calculating any pair of image blocks corresponding to each other in the first image and the second image by the above-mentioned division module 62 based on the phase correlation method to obtain at least one displacement vector with a phase correlation degree greater than a preset threshold;

an edge detection module 64 for subjecting the first image and the second image obtained by the above-mentioned first acquisition module 61 to edge detection respectively to obtain edge feature patterns in the pair of image blocks corresponding to each other; and A second acquisition module 65 for acquiring a displacement vector that matches transformation between edge feature patterns in the pair of image blocks corresponding to each other obtained by the above-mentioned edge detection module 64 from the at least one displacement vector obtained by the above-mentioned first calculation module 63 as the displacement vector corresponding to the pair of image blocks in the motion compensation process.

The moving image compensation device provided in the embodiment of the present disclosure may be used for executing the flow of steps 101 to 105 shown in FIG. 1, and the structures of various modules may be set with reference to the above-mentioned step flow and will not be described in detail herein.

As can be seen, the embodiment of the present disclosure can obtain a displacement vector that best matches the transformation between the above-mentioned edge feature patterns from the sequence of displacement vectors obtained based on the phase plane correlation method based on the transformation of edge feature patterns in pre- and post-pictures obtained by edge detection, thereby improving representativeness of the displacement vector for actual motion of corresponding image blocks, which can address the problem that the partial displacement vector determined in MEMC algorithm has a large deviation with the actual movement of corresponding image block since the displacement vector with the highest phase correlation degree does not necessarily reflect the actual movement of the image block.

Furthermore, the embodiments of the present disclosure may allow the motion compensated images obtained by MEMC algorithm approach consistent with the transformation of edge feature patterns in pre- and post-images, which is in favor of achieving a better moving image compensation effect.

In yet another embodiment of the present disclosure, the above-mentioned device may include:

a third acquisition module 66 for acquiring centers of gravity of edge feature patterns in each image block obtained by the above-mentioned edge detection module 64 in the above-mentioned first image or the above-mentioned second image;

a patterning module 67 for connecting centers of gravity corresponding to any three image blocks in said first image or said second image obtained by the above-mentioned third acquisition module 66 into a triangle;

a second calculating module 68 for calculating affine transformation matrices before and after moving three vertices of the triangle obtained by the above-mentioned patterning module 67 along displacement vectors corresponding to image blocks in which they are located in respectively based on the above-mentioned displacement vector corresponding to every image block in the above-mentioned three image blocks obtained by the above-mentioned second acquisition module 65.

A third calculating module 69 for subjecting images in said triangle to affine transformation using the affine transformation matrices obtained by said second calculating module 68 to obtain partial compensation image corresponding to the picture in motion.

As can be seen, the above-mentioned third acquisition module 66, the patterning module 67, the second calculating module 68, the third calculating module 69 correspond to steps 106 to 109 shown in FIG. 2 respectively and structures of the modules may be set with reference to the above-mentioned flow of steps, which will not be described in detail any more herein.

It is observed that in embodiments of the present disclosure, with the motion compensation flow based on affine transformation, it is possible to cover vast majority of region in the image, thereby avoiding image loss caused by moving image blocks, and may allow image transformation in each triangle to be smooth and free of sudden change. Embodiments of the present disclosure can address the problem with prior art MEMC algorithm that the picture display uniformity is poor due to moving image blocks, are advantageous for taking full advantage of the obtained edge feature patterns to improve algorithm efficiency and may further improve moving image compensation effect.

In a preferred embodiment of the present disclosure, centers of gravity of edge feature patterns in all image blocks in the above-mentioned first image or the above-mentioned second image are connected into a triangle mesh. The triangular mesh can cover vast majority of the picture, and it is therefore possible to implement accurate moving image compensation for most pixel points.

As a specific example of the phase plane correlation, in yet another embodiment of the present disclosure, the above-mentioned first calculating module 63 may include the following structures:

A transformation unit 63*a* for subjecting any pair of image blocks corresponding to each other obtained by the above-mentioned division module 62 in the above-mentioned first image and the above-mentioned second image to Fourier transformation;

A reverse transformation unit 63*b* for subjecting the pair of image blocks after Fourier transformation by the above-mentioned transformation unit 63*a* to plural division operation and subjecting the operation result to inverse Fourier transformation to obtain a impulse function;

A peak-seeking unit 63*c* for seeking peaks in the impulse function obtained by the above-mentioned reverse transformation unit 63*b* according to preset rules to obtain at least one displacement vector with a phase correlation degree greater than the preset threshold, in which coordinates of any peak in the above-mentioned impulse function represent one displacement vector and the height of the peak represents the phase correlation degree of the displacement vector.

As can be seen, the above-mentioned transformation unit 63*c*, the reverse transformation unit 63*b* and the peak-seeking unit 63*c* correspond to steps 103*a* to 103*c* shown in FIG. 5 respectively and structures of the modules may be set with reference to the flow of the above-mentioned steps, which will not be described any more herein.

Based on this, the phase plane correlation (PPC) may utilize phase correlation degree of pre- and post-images in frequency domain to determine the displacement vector of every image block, which has advantages such as good accuracy and high flexibility. In combination of the method, embodiments of the present disclosure may utilize sorting of phase correlation degrees in combination of transformation of edge feature patterns for moving image compensation.

On the basis of the above-mentioned any moving image compensation device, the following structures may be further included:

an enlarging module 63*x* for enlarging the range of the pair of image blocks in the above-mentioned first image and the above-mentioned second image towards all around to a preset size before the above-mentioned first calculating module 63 calculates any pair of image blocks corresponding to each other in the first image and the second image by the above-mentioned division module 62 based on the phase correlation method and obtains at least one displacement vector with a phase correlation degree greater than a preset threshold; and An restoring module 63*y* for restoring the range of the pair of image blocks in the above-mentioned first image and the above-mentioned second image from the above-mentioned preset size to the original size after the above-mentioned first calculating module 63 calculates any pair of image blocks corresponding to each other in the first image and the second image by the above-mentioned division module 62 based on the phase correlation method and obtains at least one displacement vector with a phase correlation degree greater than a preset threshold.

As can be seen, the above-mentioned enlarging module 63*x* and the restoring module 63*y* correspond to the above-mentioned steps 103*x* and 103*y* respectively and structures of modules may be set with reference to the above-mentioned flow of steps, which will not be described any more herein. It is understandable that based on the above-mentioned enlarging module 63x and the restoring module 63y, for every image block, the phase plane correlation may calculate more displacement vectors in a larger image range. Therefore, embodiments of the present disclosure may well address the problem that the obtained displacement vector does not have representativeness due to the too small range of image blocks or edge lines in image blocks are intermittent and the spectrogram has large deviation. For example, for an image block of 10×10 pixels, it is possible to carry out the above-mentioned flow of steps 103a to 103c for an image in a range of 30×30 pixels with the image block as the center while calculating the displacement vector to obtain a more accurate and more representative displacement vector.

Based on the same disclosed concept, the present disclosure further provides a display device including any of the above-mentioned moving image compensation devices. It is to be noted that the display device in the present embodiment may be any product or component with display function such as a display panel, electronic paper, a mobile telephone, a tablet computer, a TV set, a notebook computer, a digital photo frame or a navigator. Since the display device includes any of the above-mentioned moving image compensation device, it is equally possible to improve the accuracy of the displacement vector determined by MEMC algorithm and is in favor of improving moving image compensation effect.

In the description of the present disclosure, it is to be noted that terms "above" and "under" etc. refer to orientational or positional relationship that are based on orientational or positional relationship shown in accompanying drawings, which is only for facilitating describing the present disclosure and simplifying the description rather than indicating or implying that the specified device or element must have the particular orientation, be constructed and operated with the particular orientation, and should not be considered as limitation to the present disclosure. Unless otherwise provisioned and defined specifically, terms such as "mounted", "joined" and "connected" should be understood in a broad sense. For example, they may be permanent connection, or detachable connection, or integratedly connection; may be mechanical connection, or electrical connection; may be direct connection, or indirect connection via an intermediate media, or an internal communication inside two elements. For one of ordinary skill in the art, it is possible to under specific meanings of the above-mentioned terms in the present disclosure according to specific circumstances.

In the description of the present disclosure, a large amount of specific details have been set forth. However, it is to be understood that embodiments of the present disclosure may be practiced without these specific details. In some embodiments, well known methods, structures and technologies are not shown in detail in order not to obscure the understanding of the present specification.

Similarly, it is to be understood that in order to simplify the present disclosure and help understanding one or more of the disclosed aspects, in the above description of illustrative embodiments of the present disclosure, features of the present disclosure are sometimes grouped into a single embodiment, drawing, or description thereof. However, the disclosed method should not be interpreted as reflecting the following intent: the claimed present disclosure requires more features than those specifically recited in each claim. More specifically, as reflected by claims, the disclosed aspects have features less than all the features of an single embodiment disclosed previously. Therefore, claims that follow a specific implementation are specifically incorporated into the specific implementation, wherein each claim itself serves as a separate embodiment of the present disclosure.

It should be noted that the above-mentioned embodiments describe the present disclosure rather than limiting the present disclosure, and those skilled in the art may contemplate alternative embodiments without departing from the scope of the appended claims. In claims, any reference numerals between parentheses should not be interpreted as limiting the claims. The word "contain" does not exclude elements or steps not listed in claims. Word "a" or "one" in front of an element does not exclude the presence of a plurality of such elements. The present disclosure may be implemented by means of hardware including several different elements and by means of a suitably programmed computer. In a unit claim that enumerates several devices, a number of these devices may be specifically embodied by the same hardware. Use of words first, second and third etc. does not denote any order. These words may be interpreted as names.

Those skilled in the art should understand that embodiments of the present disclosure may be provided as a method, a device (equipment) or a computer program product. Therefore, the present disclosure may take the form of a complete hardware embodiment, a complete software embodiment or an embodiment combining software and hardware aspects. Furthermore, the present disclosure may take the form of one or more computer program product implemented on a computer useable storage medium (including, but not limited to disk storage, read-only optical disc, optical memory etc.) and containing computer usable program codes.

The present disclosure is described with reference to flow charts and/or block diagrams of the method, device (equipment) and computer program product according to embodiments of the present disclosure. It is understood that each flow and/or block in the flow charts and/or block diagrams and combinations thereof may be implemented by computer program instructions. These computer program instructions may be provided to the processor of a general purpose computer, a special purpose computer, an embedded processor or other programmable data processing equipment to generate a machine such that instructions executed by the processor of the computer or other programmable data processing equipment generates a device that implements functions specified in one or more flows in the flow chart and/or one or more blocks in the block diagram.

These computer program instructions may be also stored in a computer readable storage that can direct a computer or other programmable data processing equipment to operate in a particular way such that instructions stored in the computer readable storage generate a manufactured article including an command equipment that implements functions specified in one or more flows of the flow chart and/or one or more blocks of the block diagram.

These computer program instructions may be also loaded onto a computer or other programmable data processing equipment such that a series of operation steps will be executed on the computer or other programmable equipment to generate computer implemented processing, so that instructions executed on the computer or other programmable equipment provide steps for implementing functions specified in one or more flows in the flow chart and/or one or more blocks in the block diagram.

It should be noted finally that, all the embodiments above is only to illustrate the technical solution of the disclosure, and not limit the scope of the disclosure; although this disclosure is illustrated in detail referring to the foregoing each embodiment, those skilled in the art should know that, they can still make modifications to the technical solution in the foregoing embodiments, or make equivalent variations to part or all of the technical features; and these modifications and variations will not make the substance of the corresponding technical solution to depart from the scope of the technical solution of the embodiments of this disclosure, they should all fall into the scope of the claims and specification of this disclosure.

The invention claimed is:

1. A moving image compensation method, comprising:
  acquiring a first image corresponding to a pre-motion picture and a second image corresponding to a post-motion picture;
  dividing the first image and the second image into a number of image blocks respectively, the image blocks in the first image and the image blocks in the second image being in one-to-one correspondence;
  performing calculation on any pair of image blocks corresponding to each other in the first image and the second image based on a phase plane correlation method to obtain at least one displacement vector with a phase correlation degree greater than a preset threshold;
  subjecting the first image and the second image to edge detection respectively to obtain edge feature patterns in the pair of image blocks corresponding to each other; and
  acquiring a displacement vector that matches a transformation between edge feature patterns in the pair of image blocks corresponding to each other from the at least one displacement vector as a displacement vector corresponding to the pair of image blocks in a motion compensation process.

2. The method of claim 1, further comprising:
  acquiring a center of gravity of the edge feature pattern in each image block in the first image or the second image;
  connecting the centers of gravity corresponding to any three image blocks in the first image or the second image into a triangle;
  calculating affine transformation matrices before and after three vertices of the triangle move along displacement vectors corresponding to image blocks in which they are located based on the displacement vector corresponding to each image block in the three image blocks; and
  subjecting images in the triangle to affine transformation using the affine transformation matrices to obtain partial compensation images corresponding to pictures in motion.

3. The method of claim 2, wherein the centers of gravity of edge feature patterns in all of the image blocks in the first image or the second image are connected into a triangular mesh.

4. The method of claim 1, wherein the performing calculation on any pair of image blocks corresponding to each other in the first image and the second image based on a phase plane correlation method to obtain at least one displacement vector with a phase correlation degree greater than a preset threshold comprises:
  subjecting any pair of image blocks corresponding to each other in the first image and the second image to Fourier transformation;
  subjecting the image block after Fourier transformation to plural division operation and subjecting the operation result to inverse Fourier transformation to obtain an impulse function;
  seeking peaks in the impulse function according to preset rules to obtain at least one displacement vector with a phase correlation degree greater than the preset threshold, in which coordinates of any peak in the impulse function represent one displacement vector and a height of the peak represents the phase correlation degree of the displacement vector.

5. The method of claim 1,
  wherein, before the performing calculation on any pair of image blocks corresponding to each other in the first image and the second image based on a phase plane correlation method to obtain at least one displacement vector with a phase correlation degree greater than a preset threshold, the method further comprises:
  enlarging a range of the pair of image blocks in the first image and the second image towards all around to a preset size; and
  wherein, after the performing calculation on any pair of image blocks corresponding to each other in the first image and the second image based on a phase plane correlation method to obtain at least one displacement vector with a phase correlation degree greater than a preset threshold, the method further comprises:
  restoring the range of the pair of image blocks in the first image and the second image from the preset size to an original size.

6. The method of claim 1, wherein the step of subjecting the first image and the second image to edge detection respectively to obtain edge feature patterns in the pair of image blocks corresponding to each other comprises:
  obtaining edge lines in the first image and the second image using an edge detection algorithm;
  for an entirely closed edge line, a pattern including a part of a region enclosed by the entirely closed edge line that is in an image block and a boundary of the image block is used as the edge feature pattern in the image block; and
  for a non-entirely closed edge line, a part of said non-entirely closed edge line that is in an image block is used as the edge feature pattern in the image block.

7. The method of claim 1, wherein the step of acquiring a displacement vector that matches a transformation between edge feature patterns in the pair of image blocks corresponding to each other from the at least one displacement vector comprises:
  moving edge feature patterns in image blocks in the first image along the above-mentioned at least one displacement vectors respectively;
  comparing the moved edge feature patterns and edge feature patterns in corresponding image blocks in the second image to determine an overlapping degree between the moved edge feature patterns and edge feature patterns in corresponding image blocks in the second image; and
  determining a displacement vector corresponding to a moved edge feature pattern having a highest overlapping degree with the edge feature pattern in the corresponding image block in the second image as the displacement vector that matches the transformation between edge feature patterns in the image blocks corresponding to each other in the first image and the second image.

8. The method of claim 1, wherein the number of the image blocks have an equal area and a same shape.

9. A moving image compensation device, comprising:
a first acquisition module for acquiring a first image corresponding to pre-motion picture and a second image corresponding to post-motion picture;
a division module for dividing the first image and second image obtained by the first acquisition module into a number of image blocks respectively, in which image blocks in the first image and image blocks in the second image are in one-to-one correspondence;
a first calculation module for performing calculating any pair of image blocks corresponding to each other in the first image and the second image by the division module based on phase plane correlation method and obtaining at least one displacement vectors with a phase correlation degree greater than a preset threshold;
an edge detection module for subjecting the first image and the second image obtained by the first acquisition module to edge detection respectively to obtain edge feature patterns in the pair of image blocks corresponding to each other; and
a second acquisition module for acquiring a displacement vector that matches a transformation between edge feature patterns in the pair of image blocks corresponding to each other from the at least one displacement vector obtained by the first calculation module as a displacement vector corresponding to the pair of image blocks in a motion compensation process.

10. The method of claim 9, further comprising:
a third acquisition module for acquiring centers of gravity of edge feature patterns in each image block obtained by the edge detection module in the first image or the second image;
a patterning module for connecting centers of gravity corresponding to any three image blocks in the first image or the second image obtained by the third acquisition module into a triangle;
a second calculating module for calculating affine transformation matrices before and after moving three vertices of the triangle obtained by the patterning module along displacement vectors corresponding to image blocks in which they are located in respectively based on the displacement vector corresponding to every image block in the three image blocks obtained by the second acquisition module; and
a third calculating module for subjecting images in the triangle to affine transformation using the affine transformation matrices obtained by the second calculating module to obtain partial compensation image corresponding to the picture in motion.

11. The device of claim 10, wherein the centers of gravity of edge feature patterns in all of the image blocks in the first image or the second image are connected into a triangular mesh.

12. The device of claim 9, wherein the first calculating module comprises:
a transformation unit for subjecting any pair of image blocks corresponding to each other obtained by the division module in the first image and the second image to Fourier transformation;
a reverse transformation unit for subjecting the pair of image blocks after Fourier transformation by the transformation unit to plural division operation and subjecting the operation result to inverse Fourier transformation to obtain a impulse function; and
a peak-seeking unit for seeking peaks in the impulse function obtained by the reverse transformation unit according to preset rules to obtain at least one displacement vector with a phase correlation degree greater than the preset threshold, in which coordinates of any peak in the impulse function represent one displacement vector and a height of the peak represents the phase correlation degree of the displacement vector.

13. The device of claim 9, further comprising:
an enlarging module for enlarging the range of the pair of image blocks in the first image and the second image towards all around to a preset size before the first calculating module calculates any pair of image blocks corresponding to each other in the first image and the second image by the division module based on the phase plane correlation method and obtains at least one displacement vectors with a phase correlation degree greater than a preset threshold; and
an restoring module for restoring the range of the pair of image blocks in the first image and the second image from the preset size to an original size after the first calculating module calculates any pair of image blocks corresponding to each other in the first image and the second image by the division module based on the phase correlation method and obtains at least one displacement vectors with a phase correlation degree greater than a preset threshold.

14. The device of claim 9, wherein: the edge detection module is configured for:
obtaining edge lines in the first image and the second image using an edge detection algorithm;
for an entirely closed edge line, a pattern including a part of a region enclosed by the entirely closed edge line that is in an image block and a boundary of the image block is used as the edge feature pattern in the image block; and
for a non-entirely closed edge line, a part of the non-entirely closed edge line that is in an image block is used as the edge feature pattern in the image block.

15. The device of claim 9, wherein: the second acquisition module is configured for:
moving edge feature patterns in image blocks in the first image along the above-mentioned at least one displacement vectors respectively;
comparing the moved edge feature patterns and edge feature patterns in corresponding image blocks in the second image to determine an overlapping degree between the moved edge feature patterns and edge feature patterns in corresponding image blocks in the second image; and
determining a displacement vector corresponding to a moved edge feature pattern having a highest overlapping degree with the edge feature pattern in the corresponding image block in the second image as the displacement vector that matches the transformation between edge feature patterns in the image blocks corresponding to each other in the first image and the second image.

16. The device of claim 9, wherein: the number of the image blocks have an equal area and a same shape.

17. A moving image compensation device, comprising:
one or more processors; and
a storage medium storing computer readable operation instructions; while the instructions are executed, the processor is caused to carry out steps of:

acquiring a first image corresponding to a pre-motion picture and a second image corresponding to a post-motion picture;

dividing the first image and the second image into a number of image blocks respectively, the image blocks in the first image and the image blocks in the second image being in one-to-one correspondence;

performing calculation on any pair of image blocks corresponding to each other in the first image and the second image based on a phase plane correlation method to obtain at least one displacement vector with a phase correlation degree greater than a preset threshold;

subjecting the first image and the second image to edge detection respectively to obtain edge feature patterns of the pair of image blocks corresponding to each other; and acquiring a displacement vector that matches a transformation between edge feature patterns in the pair of image blocks corresponding to each other from the at least one displacement vector as a displacement vector corresponding to the pair of image blocks in a motion compensation process.

\* \* \* \* \*